United States Patent
Boland et al.

(10) Patent No.: US 6,353,621 B1
(45) Date of Patent: Mar. 5, 2002

(54) METHOD TO ALLOW SEAMLESS SERVICE TO MOBILE SUBSCRIBERS ACROSS VARIOUS MOBILE SWITCHING CENTERS SUPPORTING MULTIPLE INTERSYSTEM STANDARDS

(75) Inventors: Richard R. Boland, LaGrange; Patrick Joseph Boyle, Naperville; John M. Gafrick, Naperville; Mark A. McCormick, Naperville; Leslie J. Williams, Naperville, all of IL (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/153,319

(22) Filed: Sep. 15, 1998

(51) Int. Cl.[7] ............... H04M 7/00; H04M 7/10; H04J 3/16; H04J 3/22
(52) U.S. Cl. ............... 370/467; 370/328; 370/340; 370/475; 370/913; 375/220; 379/339; 379/353; 455/422; 455/426; 455/433; 455/435; 455/461; 455/560; 709/227; 709/229; 709/230; 709/231; 709/232; 709/249
(58) Field of Search ............... 370/355, 389, 370/392, 409, 410, 328, 339, 340, 467, 475, 492, 501, 522, 913; 375/220; 379/339, 353; 455/422, 426, 432, 433, 435, 461, 560; 709/227, 228, 229, 230, 231, 232, 249

(56) References Cited

U.S. PATENT DOCUMENTS

| | | | |
|---|---|---|---|
| 5,838,782 A | * 11/1998 | Lindquist | 379/230 |
| 5,852,660 A | * 12/1998 | Lindquist et al. | 379/230 |
| 5,862,481 A | * 1/1999 | Kulkarni et al. | 455/432 |
| 5,889,954 A | * 3/1999 | Gessel et al. | 395/200.53 |
| 5,907,550 A | * 5/1999 | Hontz | 370/389 |

(List continued on next page.)

OTHER PUBLICATIONS

Noriko Takezaki. "NTT DoCoMo's IMT-2000: The Next World Standard for Mobile Communications?" Nov. 1997. http://www.computingjapan.com/magazine/issues/1997/nov97/1197imt2000.html.*

Akira Yamaguchi, Yoshihiko Nodera, Masayoshi Ohashi, Seiichiro Sakai, Toshinori Suzuki, Fumio Watanabe and Toshio Mizuno. "Interoperability of PDC with GSM." IEEE 1995. pp. 452–456.*

(List continued on next page.)

*Primary Examiner*—Hassan Kizou
*Assistant Examiner*—Joseph Logsdon

(57) ABSTRACT

The invention provides systems, including a methods and apparatus, for providing seamless telephone service across MSC's that support multiple or different protocols. In accordance with a preferred embodiment of the invention, the home mobile switching center, where the subscriber record is stored, is equipped to respond to a first inquiry signal from an originating mobile switching center by identifying itself to the originating mobile switching center. The incoming call may then be trunked to the home mobile switching center and forwarded to the visited mobile switching center according to the second protocol. According to another preferred embodiment, in response to the first inquiry signal, the home mobile switching center sends a second inquiry signal to the visited mobile switching center. The first inquiry signal represents a request for an identification number identifying, in the first protocol, the visited mobile switching center. The second inquiry signal represents a request for an identification number identifying in the second protocol, visited mobile switching center. In response to the second inquiry signal, the visited mobile switching center returns a first response signal to the home mobile switching center. In response to the first response signal, the home mobile switching center sends a second response signal to the originating mobile switching center, the second response signal representing, in the first protocol, a number identifying the visited mobile switching center. The call is then directly routed from the originating mobile switching center to the visited mobile switching center.

20 Claims, 14 Drawing Sheets

U.S. PATENT DOCUMENTS

| | | | | |
|---|---|---|---|---|
| 5,946,634 A | * | 8/1999 | Korpela | 455/552 |
| 6,002,931 A | * | 12/1999 | Yamaguchi et al. | 455/433 |
| 6,018,657 A | * | 1/2000 | Kennedy, III et al. | 455/426 |
| 6,069,899 A | * | 5/2000 | Foley | 370/494 |
| 6,081,705 A | * | 6/2000 | Houde et al. | 45/411 |
| 6,101,549 A | * | 8/2000 | Baugher et al. | 709/238 |
| 6,104,716 A | * | 8/2000 | Crichton et al. | 370/401 |
| 6,122,510 A | * | 9/2000 | Granberg | 455/433 |
| 6,128,503 A | * | 10/2000 | Granberg et al. | 455/461 |
| 6,131,040 A | * | 10/2000 | Knuutila et al. | 455/550 |
| 6,181,695 B1 | * | 1/2001 | Curry et al. | 370/356 |

OTHER PUBLICATIONS

Y. Nodera, M. Ohashi, S. sakai, T. Suzuki, A. Yamaguchi and T. Mizuno. "Interworking between GSM and PDC through IC Cards." IEEE 1995. pp. 761–765.*

Akira Yamaguchi, Shinji Ota, Yoshihiko Ito, Masayoshi Ohashi and Fumio Watanabe. "Inter–system mobility and service management in GSM/PDC roaming." IEEE 1997. pp. 694–698.*

Chan Park, Sang Man Lee, and Hyup Jong Kim. "The Operation of IP and Address Resolution over the ATM Interworking Unit." IEEE 1996. pp. 444–448.*

Yeonghwan Tscha, Gakjin Choi, Kyoon Ha Lee. "A subscriber Signalling Gateway between CDMA Mobile Stations and GSM Mobile Switching Center." IEEE 1993. pp. 181–185.*

Vijay K. Varma. "Two Approaches to Messaging Services Using PACS." IEEE1997. pp. 588–592.*

Jorge A. Cobb, Chris C. Edmondson–Yurkanan, and Mohamed G. Gouda. "Universal Mobile Addressing in the Internet." IEEE 1995. pp. 24–31.*

Goran AP Eriksson, Birgitta Olin, Krister Svanbro and Dalibor Turina. "The challenges of voice–over–IP–over––wireless." Ericsson Review No. 1, 2000. pp. 20–31.*

David Crowe. "Wireless Standards: From 2G to 3G." IIR Wireless Internet Forum 2000, Nov. 27–29, 2000.*

* cited by examiner

HOME MSC

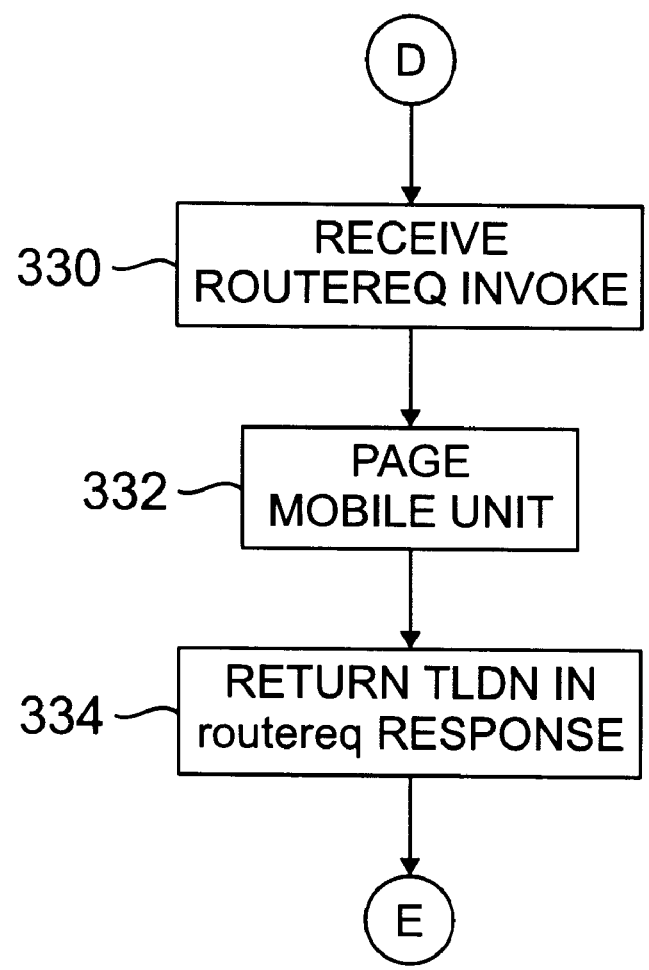
FIG. 3C
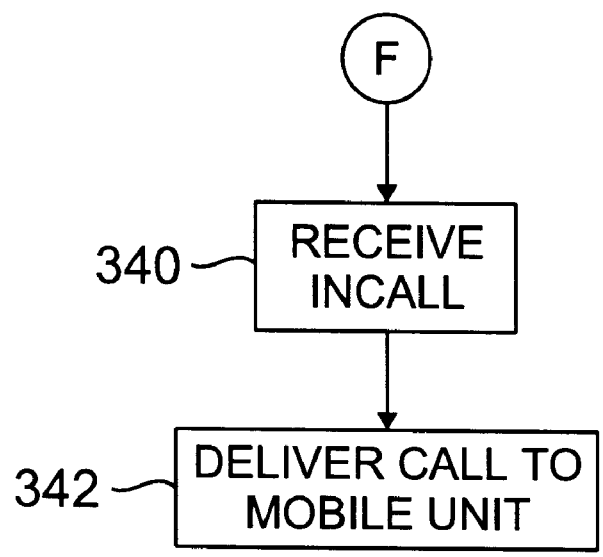

HOME MSC

METHOD TO ALLOW SEAMLESS SERVICE TO MOBILE SUBSCRIBERS ACROSS VARIOUS MOBILE SWITCHING CENTERS SUPPORTING MULTIPLE INTERSYSTEM STANDARDS

TECHNICAL FIELD

The present invention relates generally to cellular mobile communication systems. In particular, the present invention relates to a method and system for permitting seamless wireless telephone service across mobile switching centers that support multiple or different standards.

DESCRIPTION OF THE PRIOR ART

Cellular telephone service has been in widespread use for several years. Typical systems are characterized by radio coverage divided into small areas or "cells" using low power transmitters and coverage-restricted receivers. Such systems are described in U.S. Pat. Nos. 3,906,166 and 4,268,722. A cellular system is typically characterized by a pair of radio frequencies associated with each radio channel in each cell. Several voice channels and at least one signaling channel (also known as a control or access channel) are associated with each cell. The signaling channel processes requests for service to and from mobile and portable phones in order to permit the mobile or portable phone user to converse with another party. A series of Mobile Switching Centers (MSC's) associated with the cellular system provides the logical control features for efficient call routing and processing.

Numerous intersystem standards or protocols for U.S. cellular radiotelephone systems have been promulgated by the Electronics Industries Association/Telecommunications Industry Association (EIA/TIA) in order to ensure compatibility between MSC's manufactured by different vendors for use in the United States and its territories. For example, United States manufacturers currently support the ANSI-41 standard in their MSC equipment. For various reasons, such standards have not been adopted globally. Rather, the cellular networks in many foreign countries are characterized by different protocols. For example, the European Community favors a standard known as A Global System for Mobile Communication (GSM). Other nations, such as South Korea, have adopted their own internal standards, for example, a standard referred to as K-MAP, for cellular communications networks. Such standards differ in the particular content and format of the messaging involved over the datalink connecting MSC's in a cellular network.

In foreign countries, service providers are recognizing that superior technology and enhanced features sets are provided by MSC equipment manufactured in the U.S. and supporting standards such as ANSI-41. Unfortunately, for such foreign service providers who have implemented their networks according to different standards or protocols, adoption of the new standards is problematic and expensive. Because simultaneous replacement of the entire network of MSC equipment is prohibitively costly, such service providers have opted to migrate gradually to the new standards. During this transition, it is advantageous and necessary to provide MSC's which are capable of supporting both the old and new standards. However, a system for providing seamless service between an MSC supporting only the old standard to an MSC supporting the new standard has not heretofore been provided.

The aforementioned problems can be further illustrated with reference to a cellular system according to the prior art Korean K-MAP protocol. The messaging and call routing according to such a system is illustrated in FIG. 1. As will be recognized by those of ordinary skill, the thin profile arrows in FIG. 1, and the subsequent FIGURES, represent messaging via the signaling channel and datalinks connecting the MSC's. The broader profile arrows depict voice channel communication that is routed over the trunk lines (not shown). Consistent with the same convention, a capital letter designation for message names represents an inquiry or invoke message, while lower case letters represent return results.

The term INCALL is used throughout this specification to refer to an incoming call which may arrive from the Public Switched Telephone Network (PSTN) or from another mobile phone. The term "V-MSC" will be used throughout this specification to refer to a Visited MSC—an MSC associated with the particular cell visited by the mobile. The term "H-MSC" will be used throughout this specification to refer to a Home MSC—an MSC where the subscriber record for the mobile resides. The term "O-MSC" will be used to refer to the Originating MSC—the MSC where the call to a mobile originates.

Referring to FIG. 1, when mobile 10 is powered-up or enters a cell, the mobile registers in that particular cell. When mobile 10 registers, the V-MSC sends a message, REGISTRATION(MSRN) to the H-MSC. REGISTRATION(MSRN) includes the Mobile Switch Routing Number (MSRN) which identifies the V-MSC. The MSRN is stored at the H-MSC for future reference. An MSRN is a static 14-digit number defined by the K-MAP standard that identifies a particular MSC and enables any other MSC in the system to address the MSC via datalink. In an MSRN, the first 7 digits identify the visited MSC and the last 7 digits identify the mobile unit. In response to the REGISTRATION(MSRN) message, the H-MSC returns a registration profile in the message registration(profile) which contains information about the particular services available to the mobile subscriber.

In accordance with prior art systems, both the O-MSC and V-MSC communicate with the H-MSC using the same protocol, for example, K-MAP protocol. When an INCALL arrives at the O-MSC, a K-MAP message, Routing Information Inquiry (MIN) (RII(MIN)) is transmitted to the H-MSC, requesting the Mobile Identification Number (MIN) of the mobile phone. In response, the H-MSC will return a K-MAP message, rii(msrn) including the MSRN of the V-MSC. Once the O-MSC has been provided with the MSRN of the V-MSC, the voice call is trunked from O-MSC to the V-MSC using the public network. The voice call is then transmitted via radio frequency from V-MSC to the mobile unit.

The aforementioned problems can be her illustrated by a hypothetical system where the V-MSC and O-MSC are connected to the H-MSC using different protocols, for example, where the O-MSC is an older unit adhering to the K-MAP protocol used in Korea and the V-MSC is a new unit adhering to the ANSI-41 protocol. The H-MSC is equipped to communicate in multiple protocols. However, under the K-MAP protocol, when an INCALL arrives at the O-MSC, the message RII(MIN), is sent to the H-MSC and the O-MSC "expects" a return response in the format of the message rii(msrn) containing the 14-digit MSRN of the V-MSC. However, the ANSI-41 protocol does not support a 14 digit static number such as the MSRN. Instead, ANSI-41 provides dynamic numbers associated with particular mobile calls. These numbers are known as Temporary Local Directory Numbers (TLDN's). As a result, the O-MSC adhering to the K-MAP standard would not "understand" a return result of a TLDN from an H-MSC operating under ANSI-41. Thus, the INCALL cannot be delivered to the mobile.

State-of-the-art MSC's support multiple protocols and may converse individually with neighboring MSC's in different standards. These MSC's permit the service provider to specify a given standard, i.e., K-MAP or ANSI-41 when provisioning datalinks between the state-of-the art MSC and other MSC's in the network that communicate according to only a single protocol. A state-of-the-art MSC is capable of routing a call from one K-MAP MSC to another K-MAP MSC or from one ANSI-41 MSC to another ANSI-41 MSC. That is, during any given time, they are able to "speak" either K-MAP or ANSI-41, but not both, while processing a particular call. Thus, state-of-the-art MSC's are not capable of providing seamless service from a K-MAP MSC to an ANSI-41 MSC. It would therefore be desirable to provide a system, including a method and an apparatus which permits seamless service between MSC's operating under different protocols.

SUMMARY OF THE INVENTION

The invention provides systems, including methods and apparatus, for providing seamless telephone service across MSC's that support multiple or different protocols. In accordance with a preferred embodiment of the invention, the H-MSC, in response to a first inquiry signal from the O-MSC requesting the identity of the V-MSC, sends a first response signal identifying itself to the O-MSC. The first response signal identifies the H-MSC according to the first protocol, for example, by forwarding its own MSRN as defined by the K-MAP standard. In essence, the H-MSC "fools" the O-MSC into "thinking" that the H-MSC is the V-MSC. The INCALL is then routed to the H-MSC. Once the INCALL is routed to the H-MSC, it can then be routed to the V-MSC via messaging in the second protocol on the datalink connecting the H-MSC and V-MSC. For example, the H-MSC sends a second inquiry signal to the V-MSC according to the second protocol by requesting a Temporary Local Directory Number (TLDN) as defined by the ANSI-41 standard. The second inquiry signal represents a request for an identification number identifying, in the second protocol, the V-MSC. In response to the second inquiry signal, the V-MSC returns a second response signal to the H-MSC. The call is then routed from the H-MSC to the V-MSC and sent to the mobile unit from the V-MSC via radio link. Thus, the INCALL is seamlessly routed from the O-MSC to the V-MSC.

In accordance with another preferred embodiment of the invention, in response to a first inquiry signal from the O-MSC, the H-MSC sends a second inquiry signal to the V-MSC. The first inquiry signal represents a request for an identification number identifying, in the O-MSC's protocol, the V-MSC. The second inquiry signal represents a request for an identification number identifying, in the V-MSC's protocol, the V-MSC. In response to the second inquiry signal, the V-MSC returns a first response signal to the home mobile switching center, identifying the V-MSC in the V-MSC's protocol. In response to the first response signal, the H-MSC sends a second response signal to the O-MSC, the second response signal representing, in the O-MSC's protocol, a number identifying the V-MSC. Once the O-MSC is provided with the identifier of the V-MSC, the call is directly routed from the O-MSC to the V-MSC.

A primary advantage of the present invention is that it provides a system for seamlessly providing mobile telephone service across mobile switching centers that adhere to different messaging protocols without requiring changes to the message processing features of those mobile switching centers. That is, neither the V-MSC nor the O-MSC requires any changes to their message processing control logic.

Other objects, advantages novel features, and the further scope of applicability of the present invention will be set forth in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings, in which like numbers refer to like parts throughout:

FIGS. 3A–3C depict the logic flow of a system according to the preferred embodiment depicted in FIG. 2A;

DETAILED DESCRIPTION OF THE PREFERRED EMBODIMENTS

Data messages on the control channel are provided first to the cell, and then through a datalink to the MSC, which establishes a voice connection between mobile radiotelephones and the main telephone network via a voice channel.

Figure 1:
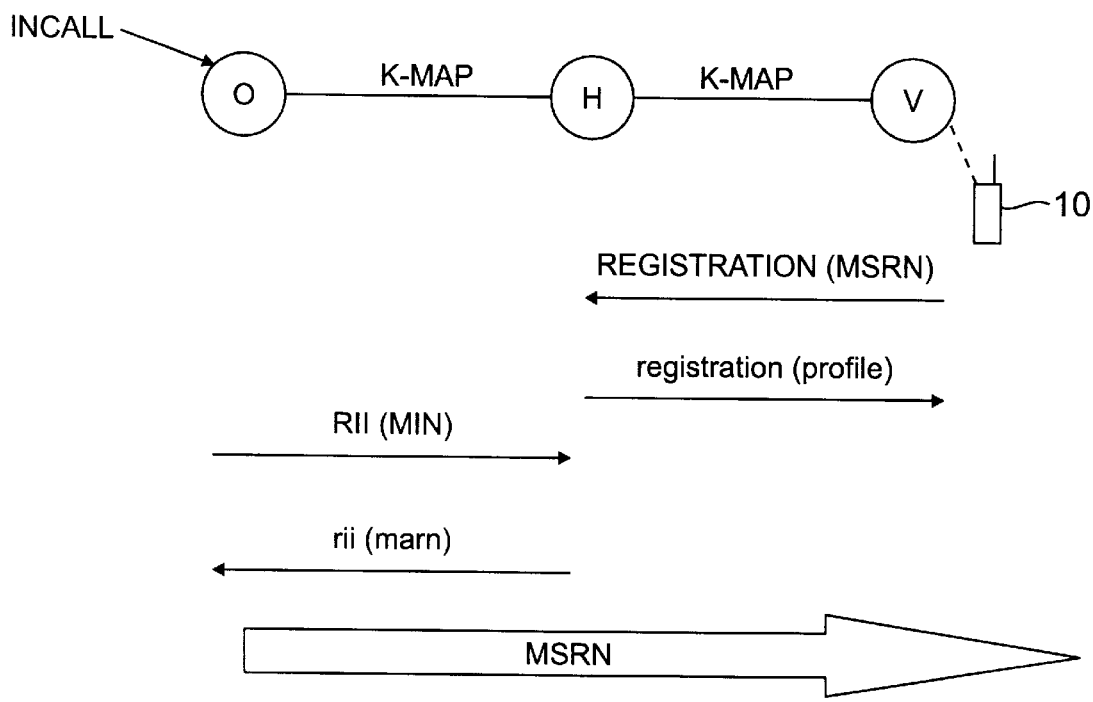
FIG. 1, as described above, is a schematic depicting the messaging and call routing flow of a prior art call routing system.
Figure 2A:
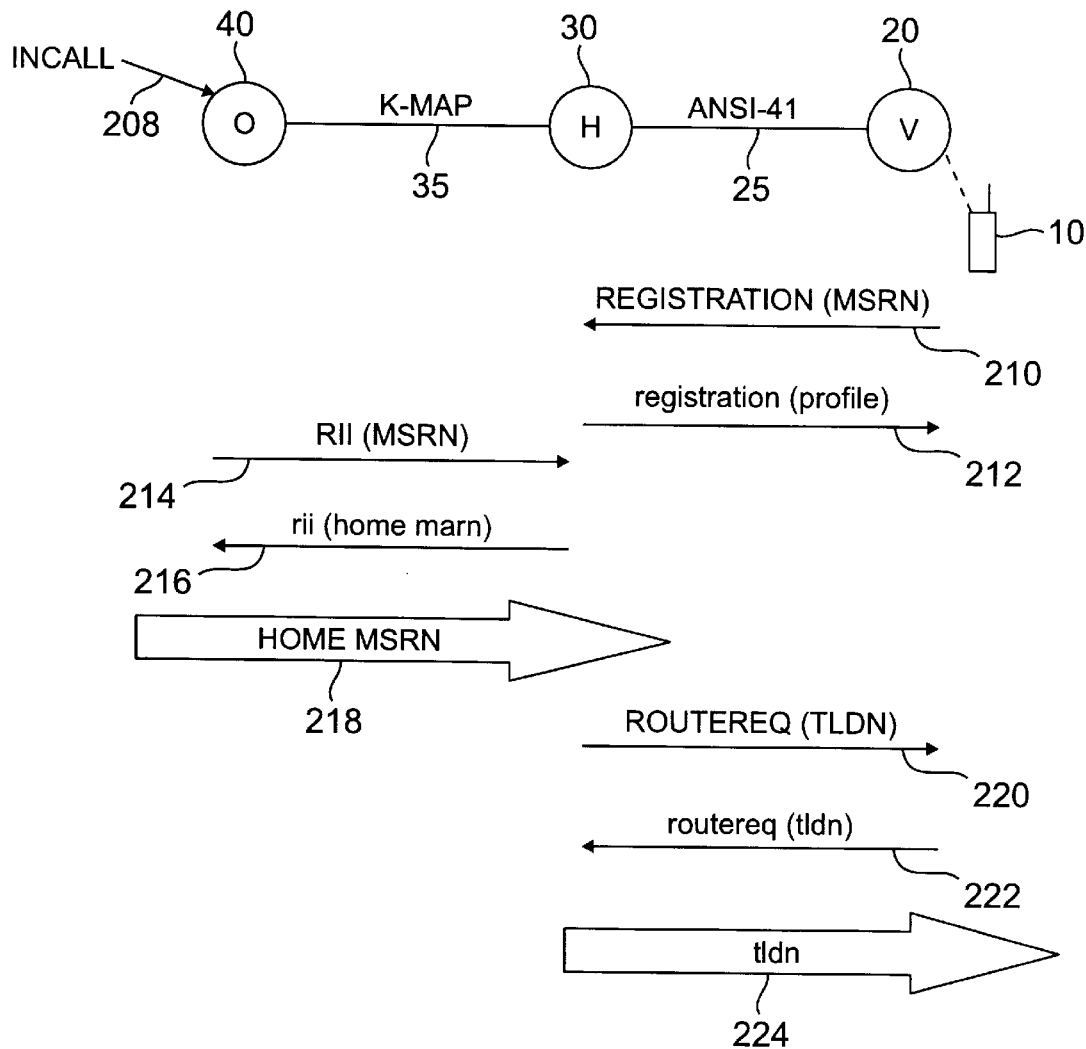
FIG. 2A is a schematic depicting the messaging and call routing according to a preferred embodiment of the present invention in which a visited mobile switching center communicates via ANSI-41 standard with a home mobile switching center and an originating mobile switching center communicates via the Korean K-MAP standard with the home mobile switching center.
Figure 2B:
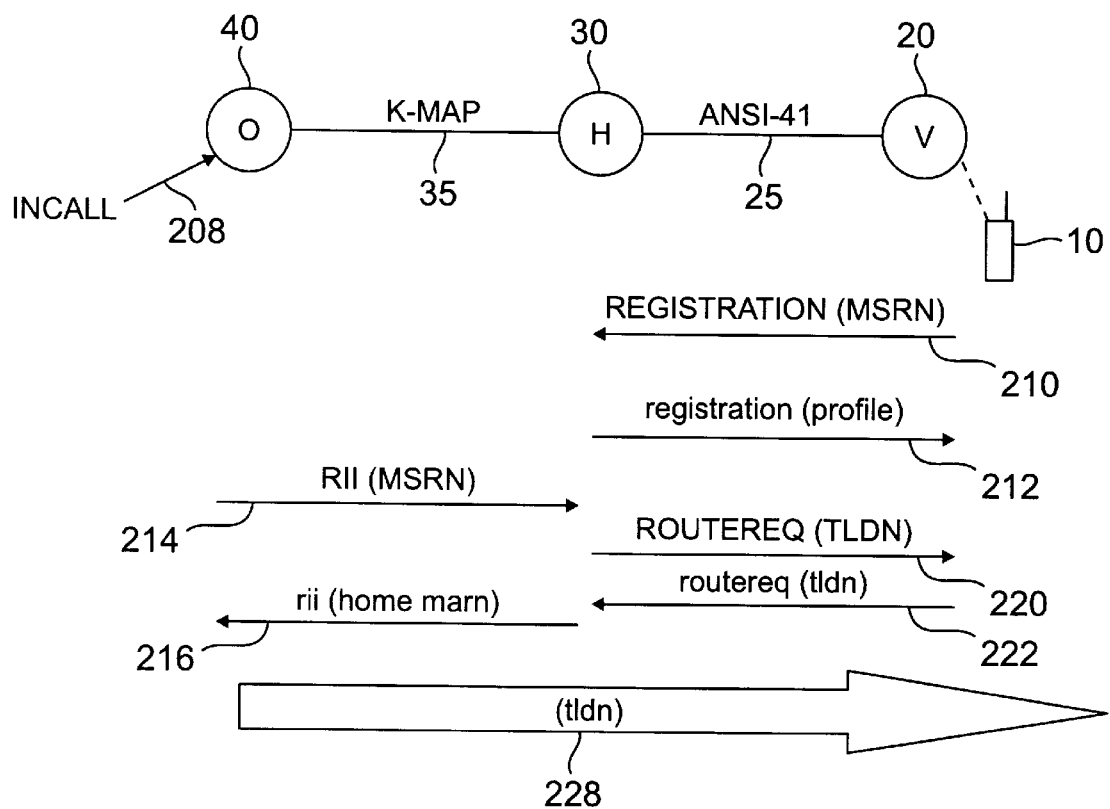
FIG. 2B is a schematic depicting the messaging and call routing according to another preferred embodiment of the present invention in which a visited mobile switching center communicates via ANSI-41 standard with a home mobile switching center and an originating mobile switching center communicates via the Korean K-MAP standard with the home mobile switching center.

FIGS. 2A and 2B illustrate a preferred embodiment of the present invention in which an O-MSC 40 communicates via datalink 35 with an H-MSC 30 according to a first protocol, for example, Korean K-MAP protocol. The H-MSC 30 and the V-MSC communicate via datalink 25 according to a second protocol, for example, ANSI-41. It will be understood that the designations "O-MSC" and "V-MSC" derive from the particular function being assumed by corresponding MSC's. That is, the O-MSC is designated as such because the INCALL originates there. Likewise, the V-MSC is defined as the MSC where a mobile unit has registered as a visiting mobile unit. On the other hand, the H-MSC, via a Home Location Register (HLR) is permanently associated with a particular mobile unit as it permanently stores subscriber information associated with that particular mobile unit.

FIG. 2A illustrates the datalink messaging and call routing according to a preferred embodiment of the present invention. When mobile unit 10 enters the cell associated with V-MSC 20, through a known process, the mobile unit 10 registers with the V-MSC 20. At the V-MSC, a determination is typically made as to whether the mobile is an authorized user or subscriber by looking up the mobile's telephone number, electronic serial number and other information provided by the phone to determine if there is an entry in a database, usually referred to as the Visiting Location Register (VLR), stored at the V-MSC 20. Part of the normal function of an MSC is to validate the Electronic Serial Number (ESN) and Mobile Identification Number (MIN) received from the mobile and to determine if the mobile unit is "home." If the mobile is not "home", the V-MSC 20, according to the ANSI-41 protocol, sends a message REGISTRATION (MSRN) 210 to the H-MSC 30. In response to that message, the H-MSC 30 returns a message registration (profile) 212 which represents a particular service profile associated with the mobile unit 10.

Under the K-MAP protocol, when an INCALL 208 originates at O-MSC, the O-MSC sends across datalink 35 an inquiry message 214 requesting a Mobile Subscriber Routing Number MSRN, which uniquely identifies the MSC where the mobile has last registered. According to the K-MAP protocol, the inquiry message 214 is called a Routing Information Inquiry RII(MSRN) 214 to H-MSC 30. Thus, RII(MSRN) represents a first inquiry signal from the O-MSC representing a request, according to the K-MAP protocol, for identification (i.e., the Mobile Switch Routing Number) of the V-MSC 20. According to K-MAP, the O-MSC will "expect" a return result containing a Mobile Subscriber Routing Number (MSRN) which is a 14-digit number, as defined by the K-MAP protocol.

According to the present invention, the H-MSC 30 is equipped to recognize the particular protocol governing communications with both O-MSC 40 and V-MSC 20. The H-MSC is provided with global look-up tables which associate a particular protocol with each MSC in the network. The tables may be stored in a stand-alone Home Location Register (HLR), in an HLR integrated into an MSC, or in the VLR of an MSC. Thus, the H-MSC 30, upon receiving the first inquiry signal, for example RII(MSRN), is able to determine that the O-MSC communicates according to a first protocol, for example, K-MAP protocol. Similarly, the H-MSC 30, upon registration of mobile unit 10 is able to determine that the V-MSC communicates with the H-MSC 30 according to a second protocol, for example, ANSI-41 protocol.

After first inquiry signal, RII(MSRN) 214 is sent, the O-MSC 40 is "expecting" the MSRN of the V-MSC. In accordance with the invention, the H-MSC is provided with appropriate processing features to return it's own MSRN to the O-MSC, thereby identifying, in K-MAP, itself to the O-MSC 40. Thus, the message rii(home msrn) 218 represents a first response signal to the first inquiry signal RII (MSRN) 214 identifying H-MSC 30. In response, INCALL 208 is routed over the public network, or "trunked" to the H-MSC 30.

Once the INCALL 208 arrives at H-MSC 30, the INCALL 208 is trunked over to the V-MSC using the ANSI-41 protocol. To accomplish this, a message ROUTEREQ (TLDN) 220 is sent to the V-MSC 20 as a second inquiry signal requesting a number, here the TLDN, identifying the V-MSC 20 in the ANSI-41 protocol. TLDN's are dynamically allocated numbers that are mapped to a particular MIN identifying mobile units registered at the V-MSC 20. In response to the second inquiry signal ROUTEREQ(TLDN) 220, the message routereq(tldn) 222 is returned, identifying the V-MSC 20 to the H-MSC 30 under the ANSI-41 protocol. The message routereq(tldn) thus represents a second response signal identifying the V-MSC in the second protocol, for example, ANSI-41. The call is then trunked over from H-MSC 30 to V-MSC 20 as represented by arrow 224 and transmitted via radio link to the mobile unit 10.

FIG. 2B represents the messaging and call routing of a system according to another preferred embodiment of the present invention. This system permits direct routing of the INCALL 208 from the O-MSC 40 to the V-MSC 20. As described above with respect to FIG. 2A, the mobile unit 10 registers at V-MSC. Then, in response to an INCALL, the O-MSC sends a first inquiry signal, in the form of message RII(MSRN) 214 to H-MSC to request a number identifying, in the first protocol, K-MAP, the V-MSC. According to this embodiment, in response to the first inquiry RII(MSRN), H-MSC sends a second inquiry signal, ROUTEREQ(TLDN) 220 in the second protocol, ANSI-41, to V-MSC requesting a TLDN. As discussed above, TLDN is a number assigned to the mobile unit 10 by the V-MSC. The TLDN is returned in message routereq(tldn) 222 to H-MSC 30. Using the global look-up tables described above, the H-MSC recognizes that the TLDN returned in message routereq(tldn) must be encoded into destination digits which identify the V-MSC to the O-MSC. Thus, as a result of this first response signal being received by the H-MSC, the H-MSC generates a second response signal, message rii(destination digits) 226 which is sent to the O-MSC. Since the V-MSC has been identified to the O-MSC, the INCALL 208 may be directly routed from the O-MSC to the V-MSC over the public access network (or by whatever means the O-MSC chooses) and delivered via radio link to the mobile unit 10.

Figure 2C:
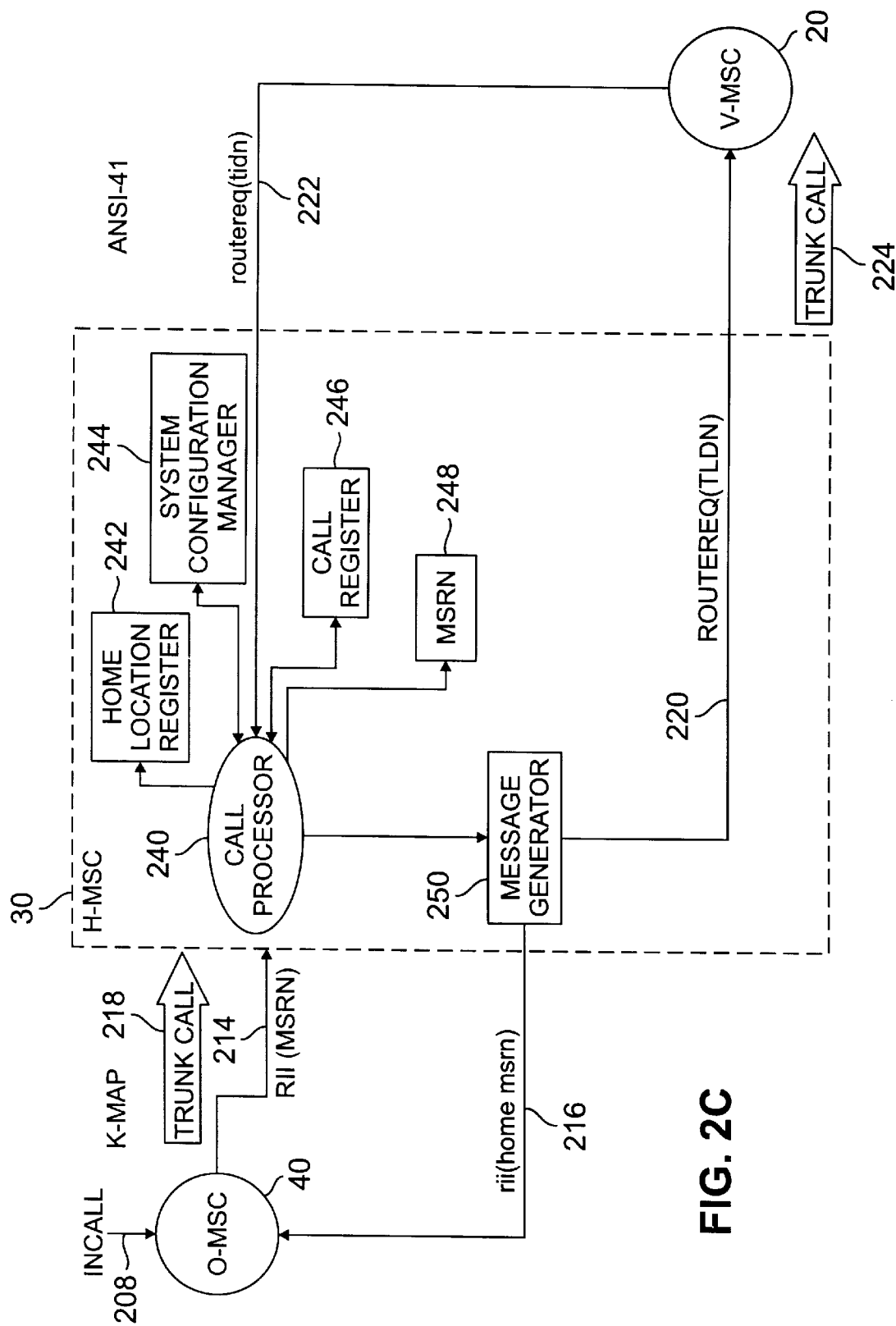
FIG. 2C is a schematic depicting the architecture of a mobile switching center according to the embodiment depicted in FIG. 2A.

FIG. 2C illustrates the architecture of an H-MSC configured to accomplish the messaging and call routing illustrated in FIG. 2A. Call processor 240, which may comprise a central processing unit, including memory for storing pre-programmed instructions, provides the control logic to process calls and messages received by H-MSC 30. Call processor 240 reads data representing a mobile subscriber profile from the HLR 242. HLR 242 is defined in global memory within the H-MSC 30. Call processor 240 also reads data representing the O-MSC (or any neighboring MSC) protocol support from system configuration manager 244. Call processor 240 writes local variables—variables which are local to the H-MSC—to a call register 246 defined in memory. Similarly, data representing an MSRN is written to memory as represented by block 248. The MSRN is a number represented in memory which identifies a particular call being processed by call processor 240.

In response to message RII(MSRN) 214, message generator 250 returns message rii (home MSRN) 216 identifying the H-MSC to the O-MSC. In response, the call is trunked to the H-MSC as represented by broad arrow 218. Call processor 240 reads local-variable information from the call register 246. Similarly, data representing the neighboring MSC protocol support is read from the system configuration manager 244. Call processor 240 then instructs message generator to generate a ROUTEREQ(TLDN) signal 220 to obtain the TLDN of the V-MSC in the ANSI-41 protocol. In response a return result routereq(tldn) 222 is sent back to the call processor 240 of H-MSC 30 and the call is trunked at 224.

Figure 2D:
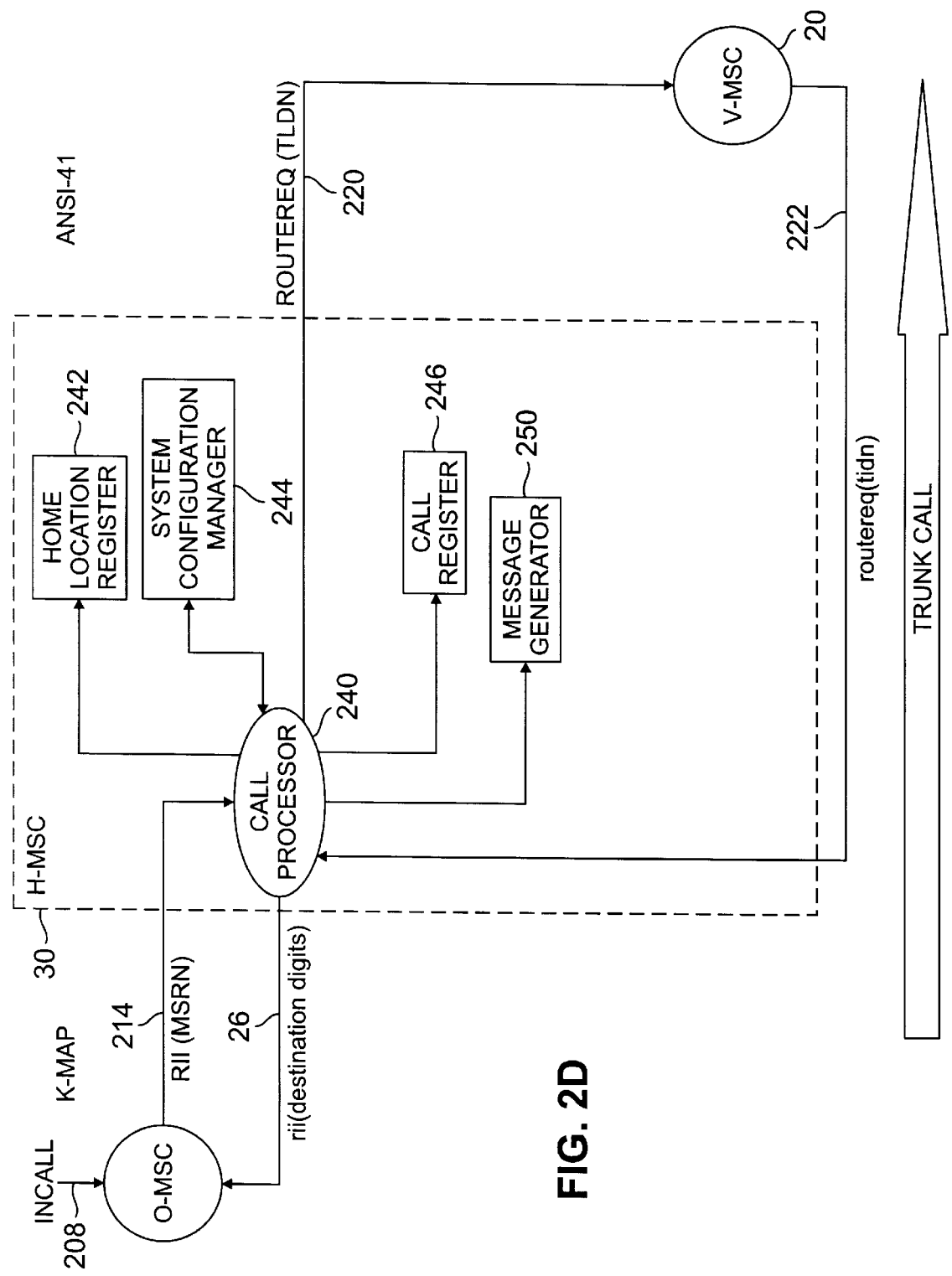
FIG. 2D is a schematic depicting the architecture of a mobile switching center according to the embodiment depicted in FIG. 2B.

FIG. 2D illustrates the architecture of an H-MSC configured to accomplish the messaging and call routing illustrated in FIG. 2B. Call processor 240 reads data representing a subscriber profile from HLR 242. This data permits the H-MSC to determine the location of the V-MSC at which the mobile unit is registered. Call processor 240 also reads data representing a profile of a neighboring MSC from system configuration manager 244. Call processor 240 receives an RII (MSRN) message 214 from O-MSC 40 and generates a message ROUTEREQ(TLDN) 220 to V-MSC 20. In response, V-MSC returns a result message routereq(tldn) 222 to call processor 240. In response to the return result 222, call processor 240 provides a signal to O-MSC representing a return result 226 containing the destination digits of V-MSC in the K-MAP protocol. The INCALL is then directly trunked from the O-MSC to the V-MSC.

Figure 3A:
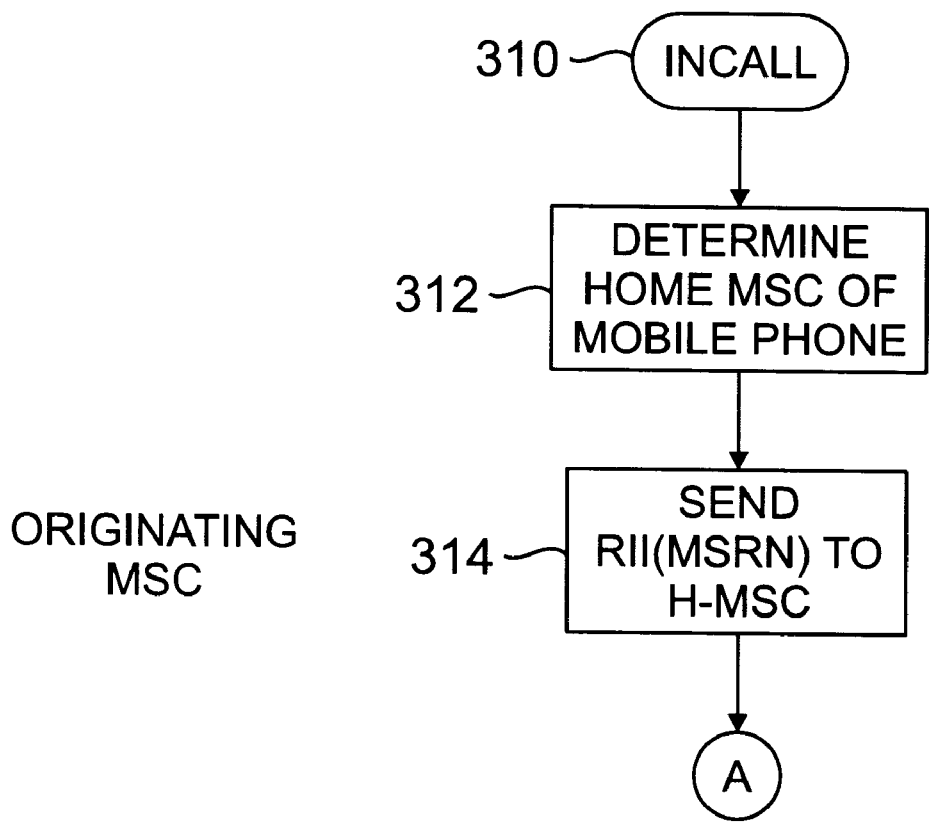
Figure 3A:
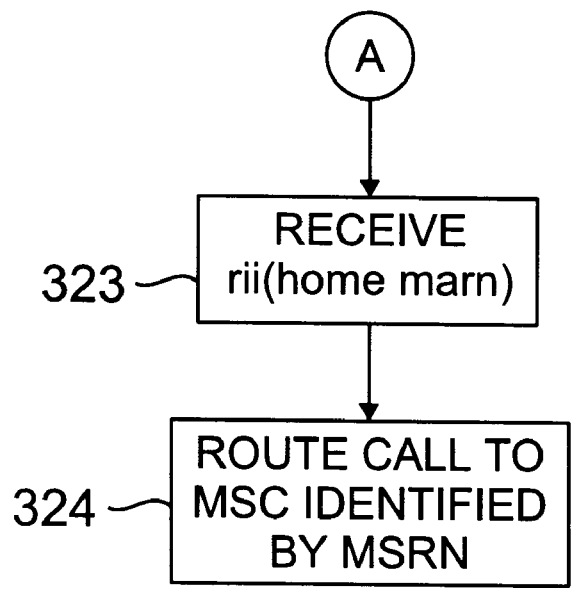
Figure 3B:
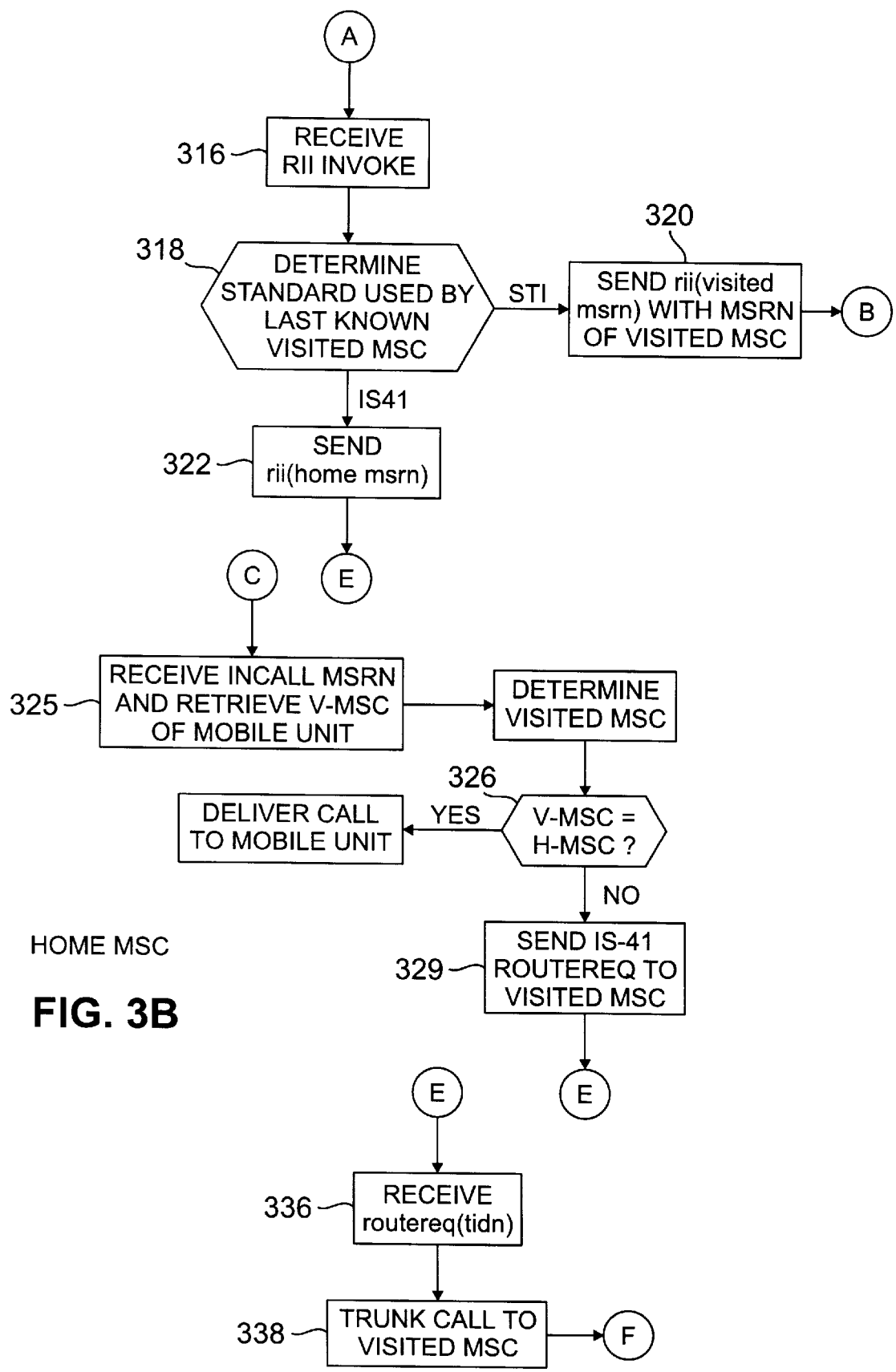

FIGS. 3A–3C represent the control logic implemented at the O-MSC, H-MSC and V-MSC, respectively, according to the preferred embodiment of the present invention described above with respect to FIG. 2A. Referring to FIG. 3A, INCALL is received at the O-MSC at state 310. At state 312, the MSRN of the H-MSC for the mobile unit is determined. The Directory Number (DN) is included as the called party number in the INCALL message that is delivered to the closest MSC. The DN is then used as a key to a table that indicates the MSC Identifier (MSCID) of the MSC where the subscriber record is stored and updated. The table dictates the datalink to be used for sending the RII or Message Location Request and permits a determination of the protocol to use and the actual message, for example, the RII under the K-MAP protocol or the Location Request under the ANSI-41 protocol. The message RII(MSRN) is sent from the O-MSC at state 314.

Referring to FIG. 3B the message RII(MSRN) is received at the H-MSC at state 316. At state 318, a determination is made as to the standard or protocol used by the last known visited MSC according to the Home Location Register (HLR). When a message is received, the information on what standard is to be used is determined from the look-up tables described above which associate a particular protocol with each MSC in the network. If the last known visited MSC adheres to the K-MAP standard, the logic proceeds to step 320 where the MSRN of the last visited MSC is returned as a result of the RII(MSRN) invoke. The call is then trunked to the identified V-MSC according to the conventional K-MAP protocol. On the other hand, if at state 318, it is determined that the last known visited MSC adhered to the ANSI-41 standard, the MSRN of the H-MSC is returned at state 322 in the message rii(home msrn).

Referring again to FIG. 3A, the return result rii(home msrn) is received by the O-MSC at state 323 and the INCALL is trunked to the H-MSC identified by home msrn at state 324. It will be recognized by those of ordinary skill that the invention does not require modified logic at the O-MSC; the logic steps performed by the O-MSC are the same as they would be if the O-MSC and H-MSC were linked via K-MAP protocol. While the logic performed at O-MSC is unchanged, the data communicated from the H-MSC to the O-MSC is different than in the purely K-MAP context. The first response signal represents the identity of the H-MSC to the O-MSC. Thus, in accordance with the invention, the messaging sent from H-MSC results in the O-MSC "thinking" it is communicating with the visited MSC.

Referring again to FIG. 3B, INCALL is received at the H-MSC at state 325. The H-MSC logic then makes a determination at state 326 as to whether the H-MSC is the MSC being visited by the mobile unit 10. In this case, the H-MSC would be the V-MSC and the call would require no further routing before being sent via radio link to mobile unit 10. If the H-MSC is not associated with the geographical region including the mobile unit 10, the H-MSC logic proceeds to state 329 where an ANSI-41 message ROUTEREQ(TLDN) is sent via datalink to the V-MSC.

Referring to FIG. 3C, the message ROUTEREQ(TLDN) is received by the V-MSC at state 330. At state 332, a paging signal may be sent via radio link to the mobile unit. When the paging signal has been acknowledged, and thus the presence of the mobile unit in the geographical region associated with the V-MSC established, a return result routereq(tldn) is messaged from the V-MSC to the H-MSC at state 334. The TLDN is assigned to each mobile unit currently registered at the V-MSC. The TLDN is assigned from a pool of numbers designated by the service provider that are used to route a call from another MSC in the network to the V-MSC. This pool is created on a per switch basis where the service provider indicates the starting number and how many of these numbers to make available. When one is assigned the TLDN is stored in a table with the actual MIN of the mobile unit 10. This TLDN is dynamically allocated. Once the TLDN is used to route the INCALL into the V-MSC, the TLDN is removed from the table and can be assigned to another mobile unit to route another call.

Referring again to FIG. 3B, the message routereq(tldn) is received by the H-MSC at state 336 and the call is trunked to the V-MSC via the public access network at state 338. Referring again to FIG. 3C, the INCALL is received at the V-MSC at state 340 and delivered to the mobile unit via radio frequency link at state 342.

Figure 4:
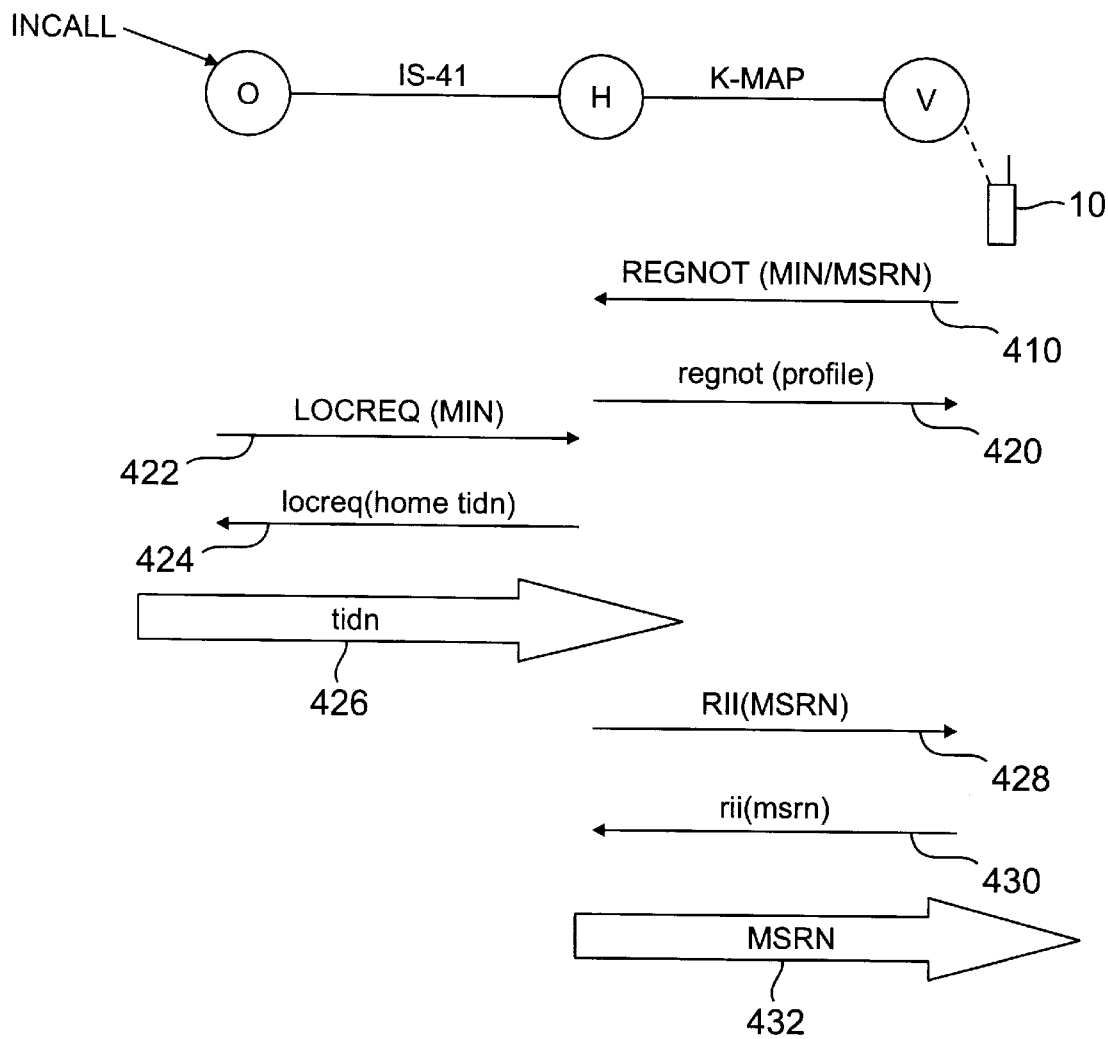
FIG. 4 is a schematic depicting the messaging and call routing according to a preferred embodiment of the present invention in which a visited mobile switching center communicates via Korean K-MAP standard with a home mobile switching center and an originating mobile switching center communicates via ANSI-41 standard with the home mobile switching center.
Figure 5:
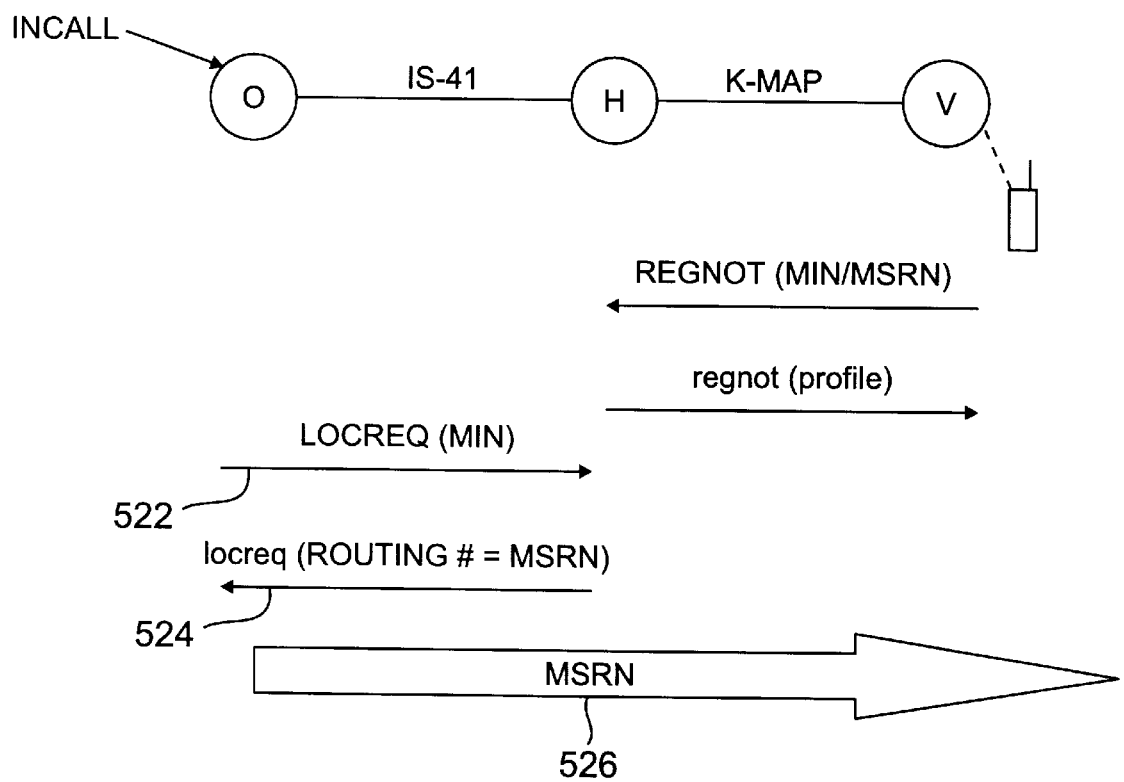
FIG. 5 is a schematic depicting the messaging and call routing according to another preferred embodiment of the present invention in which a visited mobile switching center communicates via ANSI-41 standard with a home mobile switching center and an originating mobile switching center communicates via the Korean K-MAP standard with the home mobile switching center.

FIGS. 4 and 5 depict the messaging and call routing according to a preferred embodiment of the invention for the situation where the V-MSC communicates with the H-MSC via the Korean K-MAP protocol and the O-MSC communicates with the H-MSC via the ANSI-41 standard. Registration of mobile unit 10 occurs at V-MSC in a known manner. According to the K-MAP standard, a registration notification message REGNOT (MIN/MSRN) 410 is sent to H-MSC via datalink 25. A return result regnot(profile) 420 is returned to V-MSC identifying a plurality of features that the mobile unit user is entitled to use. When an INCALL 208 is received at O-MSC, according to the ANSI-41 standard, a message LOCREQ(MIN) 422 is sent from the O-MSC to the H-MSC. LOCREQ(MIN) 422 represents a first inquiry signal representing a request for a number, i.e., MIN, identifying the MSC at which the mobile unit 10 has registered. According to the invention, in response to the inquiry signal, the return result locreq(home tldn) 424 is sent from the H-MSC to the O-MSC. Thus, the return result locreq(home tldn) is a first response signal representing a number identifying the H-MSC. As a result of the response signal, the INCALL is trunked from the O-MSC to the H-MSC as represented by arrow 426. H-MSC then sends a second inquiry signal, message RII(MSRN) 428, under the K-MAP protocol to V-MSC. A second response signal, rii(msrn) 430 is returned and the INCALL is trunked to V-MSC as represented by arrow 432.

Figure 4A:
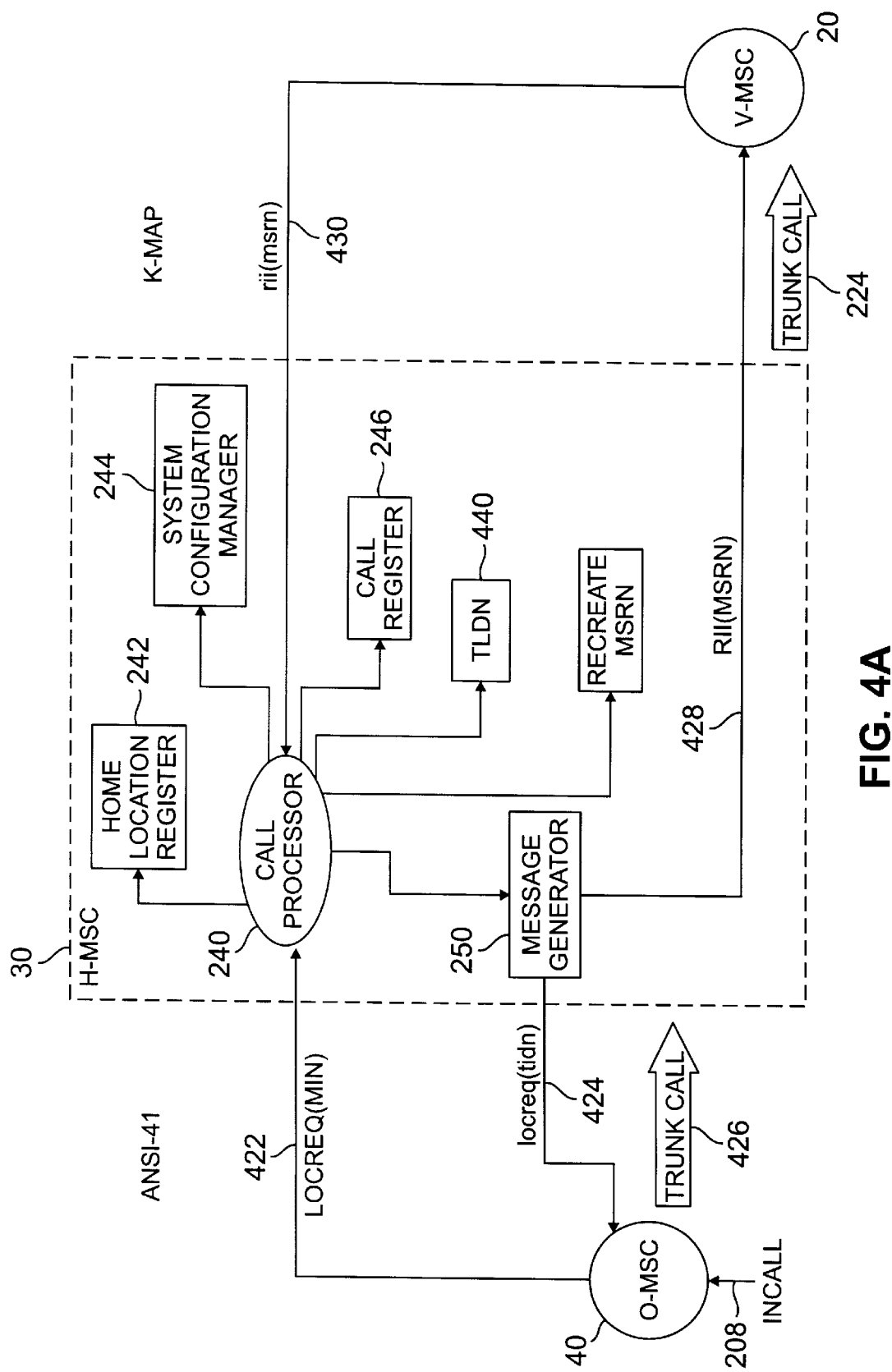
FIG. 4A is a schematic depicting the architecture of a mobile switching center according to the embodiment depicted in FIG. 4.

FIG. 4A illustrates the architecture of an H-MSC configured to accomplish the messaging and call routing illustrated in FIG. 4. Call processor 240 writes to call register 246 and to TLDN memory location which is represented at block 440. In response to receipt of message LOCREQ (MIN) 422, message generator returns a result locreq(tloln) 424 indicating the TLDN of H-MSC. Message generator 250 then returns a return result 424 to the O-MSC. In response, the call is trunked to the H-MSC as represented by broad arrow 426. Once the call is trunked to the H-MSC, a second inquiry signal RII(MSRN) 428 is sent to the V-MSC. Call processor 240 recreates an MSRN at block 248 by examining the subscriber profile in the HLR. At registration, the V-MSC passed the MSRN to the H-MSC. The V-MSC then returns a result rii(msrn) representing the MSRN of the V-MSC and the call is trunked to the V-MSC at 224.

FIG. 5 illustrates messaging and call routing according to another preferred embodiment of the present invention. Like the system depicted in FIG. 4, this system is applicable to the situation where the V-MSC communicates via K-MAP with the H-MSC and the H-MSC communicates via ANSI-41 with the O-MSC. After the registration messaging occurs as described above with reference to FIG. 4, a first inquiry signal, message LOCREQ(MIN) 522, is sent from the O-MSC in response to INCALL 208. When the message LOCREQ(MIN) 522 is received at the H-MSC, a return response locreq(routing #=msrn) 524 is returned which contains the 14-digit MSRN of V-MSC. Thus, the H-MSC creates the MSRN of the visited system and returns it in a destination parameter of the LOCREQ return response. Once the MSRN of the V-MSC is returned to the O-MSC, the INCALL can be directly routed to the V-MSC as represented by arrow 526.

The MSRN is a 14-digit number where the first seven digits indicate the MSC which contains the subscriber record. Of these first seven digits, the first three digits indicate the routing prefix, the next three digits identify a particular MSC and the last digit identifies the cellular provider. The last seven digits of the MSRN indicate the mobile number (3-digits are an office code).

Figure 5A:
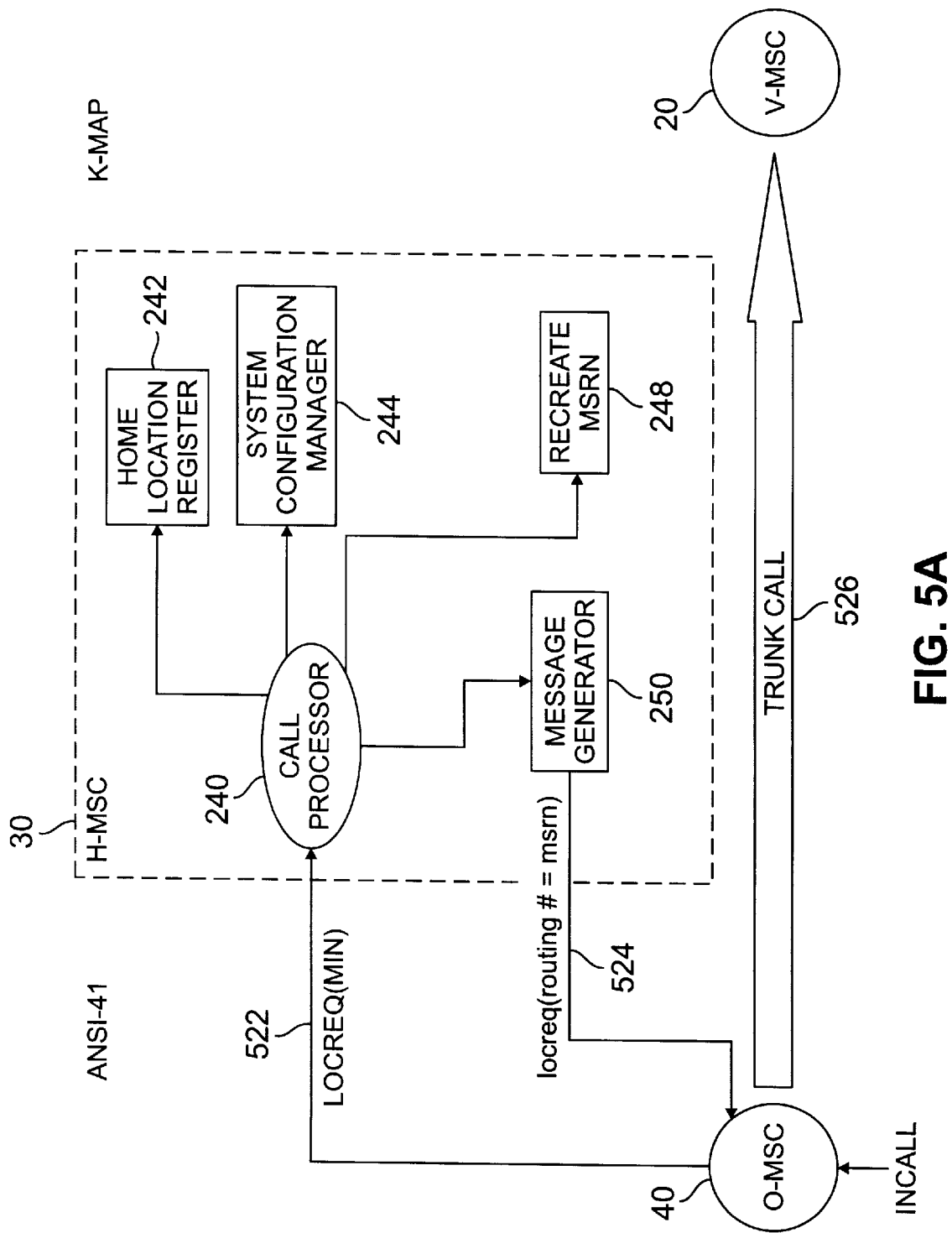
FIG. 5A is a schematic depicting the architecture of a mobile switching center according to the embodiment depicted in FIG. 5.

FIG. 5A shows the architecture of an H-MSC configured to accomplish the messaging and call routing depicted in FIG. 5. In response to message LOCREQ (MIN) 522 call processor 240 instructs message generator 250 to return a result with the MSRN of the mobile unit. The H-MSC simply returns the entire MSRN, message locreq (routing #=MSRN) 524. The H-MSC "knows" the MSRN where the mobile registered.

Figure 6A:
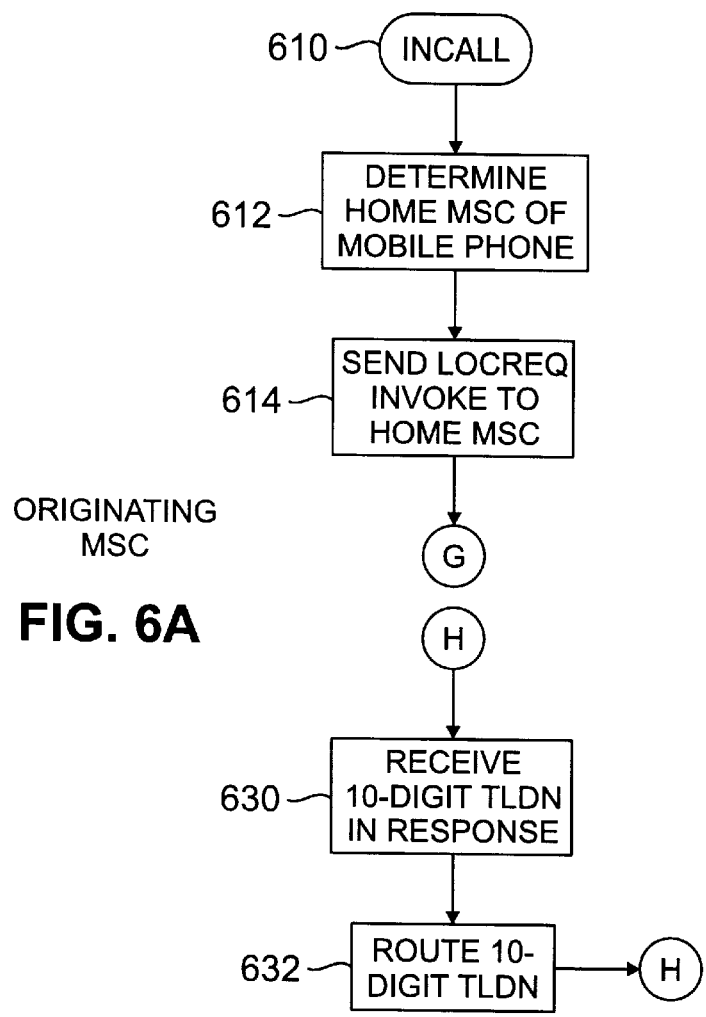
FIGS. 6A–6C depict the logic flow of a system according to the preferred embodiment depicted in FIG. 4.
Figure 6C:
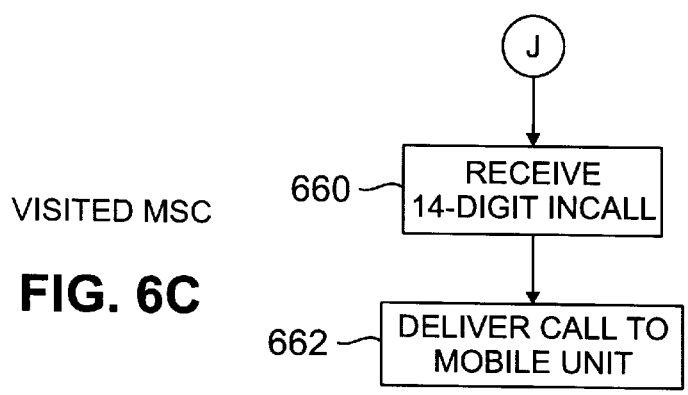
Figure 6B:
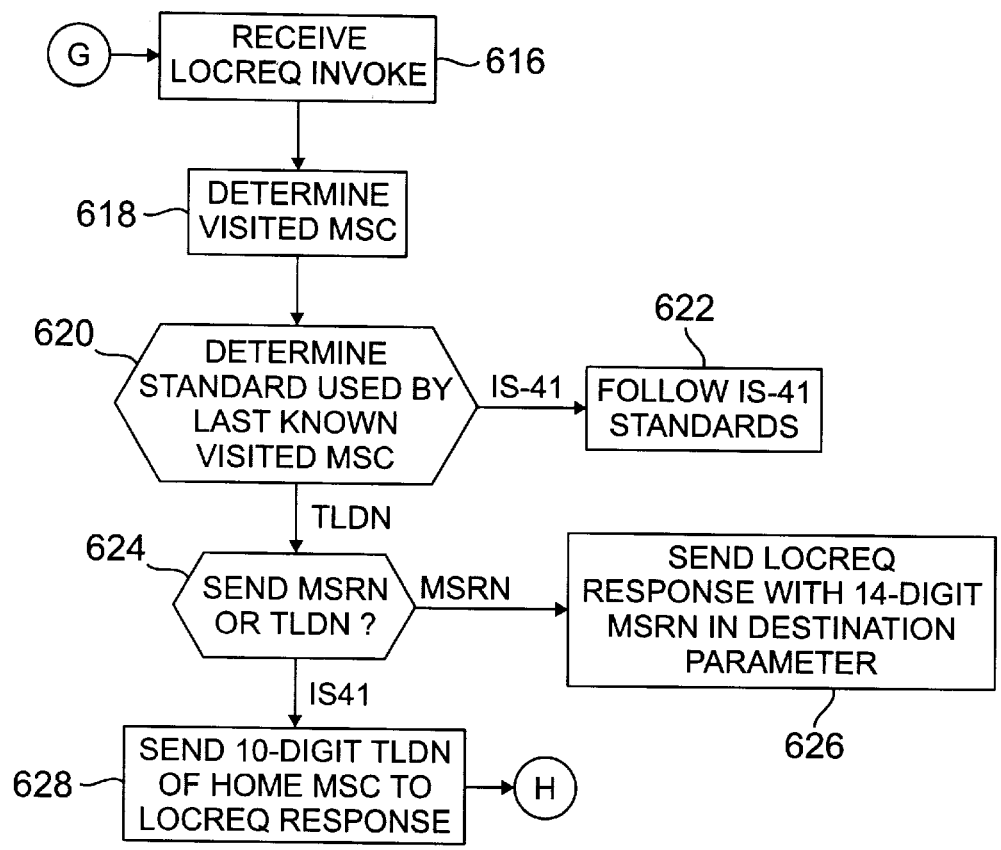
Figure 6B:
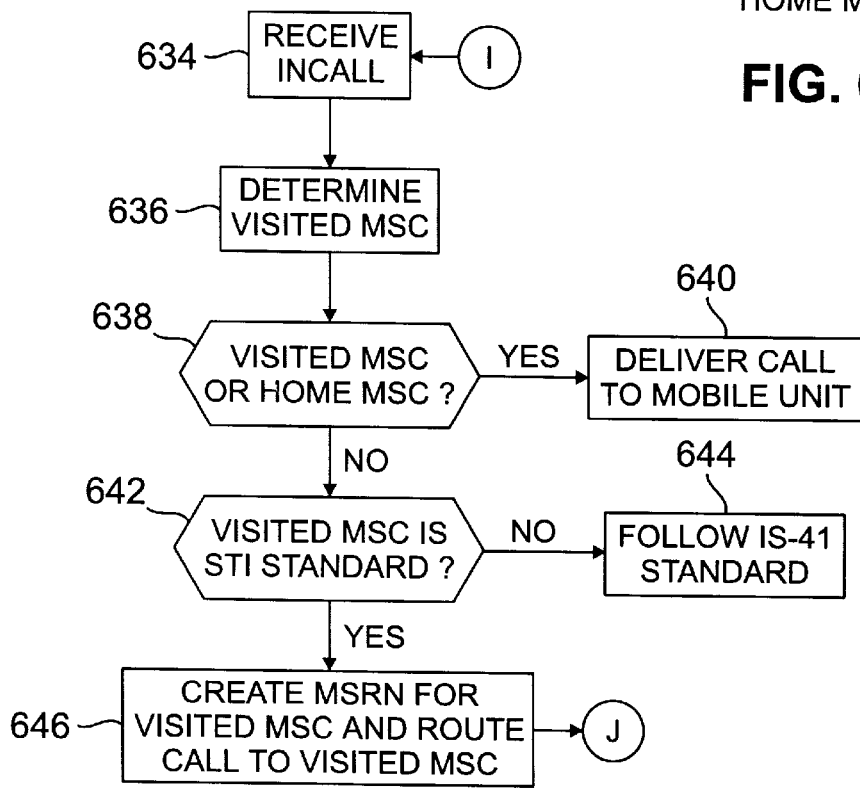

FIGS. 6A–6C depict the logic flow occurring at the O-MSC, H-MSC and V-MSC, respectively. Referring to FIG. 6A, INCALL arrives at state 610. At state 612, the home MSC corresponding to the MIN of the number associated with INCALL is determined. A message LOCREQ (MIN) is sent at state 614 to the H-MSC from the O-MSC. Referring to FIG. 6B, the LOCREQ(MIN) message is received at the H-MSC at state 616 and the V-MSC at which the mobile unit was last registered is determined at state 618. At state 620, the standard associated with the V-MSC is determined from the look-up tables described above. If the V-MSC standard is ANSI-41, the same standard for communication between the O-MSC and the H-MSC, the logic proceeds to state 622 in which the INCALL is routed to the V-MSC using the ANSI-41 standard. If, however, the standard of the V-MSC is a K-MAP standard, a determination is made at state 624 that an MSRN should be returned to the O-MSC. If an MSRN is to be returned to the O-MSC, the logic proceeds to state 626 in which the MSRN of the V-MSC is returned and the call is trunked directly to the V-MSC. This sequence corresponds to the messaging depicted in FIG. 5. If, however, at state 624, it is determined that a TLDN should be returned to the O-MSC, the 10-digit TLDN of the H-MSC is returned in the message locreq (home tldn) at state 628.

Referring again to FIG. 6A, the 10-digit TLDN is received by the O-MSC at state 630. In response, the INCALL is routed to the H-MSC at state 632. Referring again to FIG. 6B, INCALL is received at the H-MSC at state 634. The visited MSC is determined at state 636 and at decision 638, a determination is made as to whether the V-MSC is the H-MSC, in which case the call need not be further routed and may be delivered to the mobile unit 10 via radio link. If the H-MSC is not the V-MSC, the logic proceeds to decision 642 where a determination is made as to whether the V-MSC is a K-MAP MSC. If not, the call is trunked to the V-MSC using ANSI-41 standards at state 644. If the V-MSC is a K-MAP standard, an MSRN is created for the visited MSC and the call is trunked to the V-MSC using the created MSRN. The 14-digit MSRN is outpulsed onto the selected trunk along with other data including the calling party number. The trunk terminates at an entity in the network and the MSRN is converted into a DN or MIN. The process to accomplish this is to remove the first seven digits and to prepend the area code for the given area to the last seven digits of the mobile subscriber.

The foregoing merely illustrates the principles of the present invention. Those skilled in the art will be able to devise numerous alternative arrangements which, although not explicitly shown or described herein, embody those principles and are thus within the spirit and scope of the invention as defined in the appended claims.

What is claimed is:

1. In a mobile communications system including a mobile telephone, a home mobile switching center containing a subscriber record associated with the mobile telephone, an originating mobile switching center communicating with the home mobile switching center according to a first protocol and a visited mobile switching center communicating with the home mobile switching center according to a second protocol, a method of seamlessly routing an incall from the originating mobile switching center to the visited mobile switching center, the method comprising the steps of:

a) receiving a first inquiry signal at the home mobile switching center from the originating mobile switching center, the first inquiry signal representing a request, according to the first protocol, for identification of the visited mobile switching center, wherein the first and second protocols comprise any different protocols among a plurality of communication protocols, wherein step a) further comprises the step of employing a look-up table, of a plurality of look-up tables located in the home mobile switching center, to determine at the home mobile switching center that the first protocol comprises a communication protocol used by a last known visited mobile switching center, wherein the look-up table is updated according to the last known visited mobile switching center, wherein the plurality of look-up tables comprises a global look-up table that serves to map mobile switching centers to respective communication protocols;

b) in response to the first inquiry signal, sending a first response signal from the home mobile switching center to the originating mobile switching center, the first response signal representing, according to the first protocol, the identity of the home mobile switching center;

c) routing the incall from the originating mobile switching center to the home mobile switching center in response to the first response signal; and d) routing the call from the home mobile switching center to the visited mobile switching center.

2. The method according to claim 1, wherein step d) further comprises the steps of:

i) sending a second inquiry signal from the home mobile switching center to the visited mobile switching center, the second inquiry signal representing, according to the second protocol, a request for the identity of the visited mobile switching center; and ii) in response to the second inquiry signal, sending a second response signal from the visited mobile switching center to the home mobile switching center, the second response signal representing, according to the second protocol, the identity of the visited mobile switching center.

3. The method according to claim 1, wherein step a) further comprises the step of receiving a Routing Information Inquiry requesting a Mobile Subscriber Routing Number.

4. The method according to claim 1, wherein step b) further comprises the step of sending a Mobile Subscriber Routing Number identifying the home mobile switching center.

5. The method according to claim 1, wherein step a) further comprises the step of determining that the originating mobile switching center operates according to the first protocol by using the look-up table.

6. In a mobile communications system including a mobile telephone, a home mobile switching center containing a subscriber record associated with the mobile telephone, an originating mobile switching center communicating with the home mobile switching center according to a first protocol and a visited mobile switching center communicating with the home mobile switching center according to a second protocol, a method of seamlessly routing an incall from the originating mobile switching center to the visited mobile switching center, the method comprising the steps of:

a) receiving a first inquiry signal at the home mobile switching center from the originating mobile switching center, the first inquiry signal representing a request, according to the first protocol, for identification of the visited mobile switching center, wherein the first and second protocols comprise any different protocols among a plurality of communication protocols, wherein step a) further comprises the step of employing a look-up table, of a plurality of look-up tables located in the home mobile switching center, to determine at the home mobile switching center that the first protocol comprises a communication protocol used by a last known visited mobile switching center, wherein the look-up table is updated according to the last known visited mobile switching center, wherein the plurality of look-up tables comprises a global look-up table that serves to map mobile switching centers to respective communication protocols;

b) in response to the first inquiry signal, sending a second inquiry signal from the home mobile switching center to the visited mobile switching center, the second inquiry signal representing a request, according to the second protocol, for identification of the visited mobile switching center;

c) in response to the second inquiry signal, sending a first response signal from the visited mobile switching center to the home mobile switching center, the first response signal identifying, according to the second protocol, the visited mobile switching center;

d) in response to the first response signal, sending a second response signal from the home mobile switching center to the originating mobile switching center, the second response signal identifying, according to the first protocol, the visited mobile switching center; and e) routing the call from the originating mobile switching center to the visited mobile switching center in response to the second response signal.

7. The method according to claim 6, wherein step a) further comprises the step of receiving a Routing Information Inquiry requesting a Mobile Subscriber Routing Number.

8. The method according to claim 6, wherein step d) further comprises the step of sending a Mobile Subscriber Routing Number identifying the visited mobile switching center.

9. The method according to claim 6, wherein step a) further comprises the step of determining that the originating mobile switching center operates according to the first protocol by using the look-up table.

10. In a home mobile switching center for routing a call from an originating mobile switching center to a visited mobile switching center, the originating mobile switching center operating according to a first protocol and the visited mobile switching center operating according to a second protocol, a system of providing seamless call routing, the system comprising:

a) a call processor for receiving a first inquiry signal representing a request, according to the first protocol, for identification of the visited mobile switching center;

b) a message generator cooperating with the call processor for sending a first response signal to the originating mobile switching center, the first response signal representing the identity of the home mobile switching center; and c) memory storage that comprises a plurality of look-up tables, wherein a look-up table of the plurality of look-up tables is employable to determine at the home mobile switching center that the first protocol comprises a communication protocol used by a last known visited mobile switching center, wherein the look-up table is updated according to the last known visited mobile switching center, wherein the plurality of look-up tables comprises a global look-up table that serves to map mobile switching centers to respective communication protocols, wherein the first and second protocols comprise any different protocols among a plurality of communication protocols.

11. The system according to claim 10, wherein the message generator is adapted to provide a second inquiry signal to the visited mobile switching center.

12. The system according to claim 11, wherein the second inquiry signal represents a request for identification of the visited mobile switching center.

13. The system according to claim 10, wherein the look-up table is employed to determine that the originating mobile switching center operates according to the first protocol.

14. The system according to claim 10, wherein the memory storage comprises a Mobile Subscriber Routing Number identifying the home mobile switching center.

15. The system according to claim 10, further comprising a system configuration manager for determining that the originating mobile switching center operates according to the first protocol.

16. In a home mobile switching center for routing a call from an originating mobile switching center to a visited mobile switching center, the originating mobile switching center operating according to a first protocol and the visited mobile switching center operating according to a second protocol, a system of providing seamless call routing, the system comprising:

a) a call processor for receiving a first inquiry signal representing a request, according to the first protocol, for identification of the visited mobile switching center;

b) a message generator cooperating with the call processor for sending a second inquiry signal to the visited mobile switching center in response to the first inquiry signal, the second inquiry signal representing a request, according to the second protocol, for identification of the visited mobile switching center; and c) memory storage that comprises a plurality of look-up tables, wherein a look-up table of the plurality of look-up tables is employable to determine at the home mobile switching center that the first protocol comprises a communication protocol used by a last known visited mobile switching center, wherein the look-up table is updated according to the last known visited mobile switching center, wherein the plurality of look-up tables comprises a global look-up table that serves to map mobile switching centers to respective communication protocols, wherein the first and second protocols comprise any different protocols among a plurality of communication protocols.

17. The system according to claim 16, wherein the call processor is adapted to receive a first response signal from the visited mobile switching center, the first response signal identifying, according to the second protocol, the visited mobile switching center.

18. The system according to claim 17, wherein the message generator is adapted to generate a second response signal, in response to receipt of the first response signal by the call processor, the second response signal identifying, according to the first protocol, the visited mobile switching center.

19. The system according to claim 16, wherein the look-up table is employed to determine that the originating mobile switching center operates according to the first protocol.

20. The system according to claim 16, her comprising a memory storage containing a Mobile Subscriber Routing Number identifying the home mobile switching center.

* * * * *